United States Patent
Sakakibara et al.

(10) Patent No.: US 12,116,736 B2
(45) Date of Patent: Oct. 15, 2024

(54) ROAD MACHINE

(71) Applicant: SUMITOMO CONSTRUCTION MACHINERY CO., LTD., Tokyo (JP)

(72) Inventors: Akira Sakakibara, Chiba (JP); Nobuyuki Baba, Chiba (JP)

(73) Assignee: SUMITOMO CONSTRUCTION MACHINERY CO., LTD., Tokyo (JP)

( * ) Notice: Subject to any disclaimer, the term of this patent is extended or adjusted under 35 U.S.C. 154(b) by 1027 days.

(21) Appl. No.: 17/036,364

(22) Filed: Sep. 29, 2020

(65) Prior Publication Data

US 2021/0009038 A1 Jan. 14, 2021

Related U.S. Application Data

(63) Continuation of application No. PCT/JP2019/013735, filed on Mar. 28, 2019.

(30) Foreign Application Priority Data

Mar. 30, 2018 (JP) .................. 2018-068045

(51) Int. Cl.
*E01C 19/48* (2006.01)
*B60Q 5/00* (2006.01)
*B60R 1/25* (2022.01)
*B60R 1/29* (2022.01)

(52) U.S. Cl.
CPC ............ *E01C 19/48* (2013.01); *B60Q 5/005* (2013.01); *B60R 1/25* (2022.01); *B60R 1/29* (2022.01); *E01C 19/4873* (2013.01); *B60R 2300/207* (2013.01); *B60R 2300/80* (2013.01)

(58) Field of Classification Search
CPC . B60R 1/00; B60R 2300/207; B60R 2300/80; B06Q 5/005; E01C 19/4873; E01C 19/48
See application file for complete search history.

(56) References Cited

U.S. PATENT DOCUMENTS

| | | | | |
|---|---|---|---|---|
| 5,337,289 A | * | 8/1994 | Fasching | G01S 7/521 73/620 |
| 9,734,413 B2 | | 8/2017 | Ichikawa | |
| 2003/0232179 A1 | * | 12/2003 | Steenblik | G02B 5/28 428/209 |
| 2006/0045620 A1 | * | 3/2006 | Olson | E01C 19/48 404/101 |

(Continued)

FOREIGN PATENT DOCUMENTS

| | | |
|---|---|---|
| EP | 3666977 | 6/2020 |
| JP | S61-261504 | 11/1986 |

(Continued)

OTHER PUBLICATIONS

International Search Report for PCT/JP2019/013735 mailed on May 28, 2019.

*Primary Examiner* — James M McPherson
*Assistant Examiner* — Paulo Roberto Gonzalez Leite
(74) *Attorney, Agent, or Firm* — IPUSA, PLLC

(57) ABSTRACT

A road machine includes a hopper, a screed, a measuring unit configured to measure an amount of pavement material inside the hopper or pavement material held in front of the screed, and a display device disposed in an operator's seat and configured to display the amount of pavement material measured by the measuring unit.

7 Claims, 7 Drawing Sheets

(56) References Cited

U.S. PATENT DOCUMENTS

| | | | | |
|---|---|---|---|---|
| 2010/0178107 A1* | 7/2010 | Braddy | ............. | E01C 23/01 |
| | | | | 404/108 |
| 2015/0077529 A1 | 3/2015 | Hatta et al. | | |
| 2017/0314215 A1* | 11/2017 | Graham | ............. | E01C 19/48 |
| 2019/0136467 A1* | 5/2019 | Laugwitz | ............. | E01C 23/01 |
| 2019/0283583 A1* | 9/2019 | Buschmann | ............. | B60R 1/00 |

FOREIGN PATENT DOCUMENTS

| | | |
|---|---|---|
| JP | H04-179712 | 6/1992 |
| JP | H04-077608 U | 7/1992 |
| JP | H04-122706 U | 11/1992 |
| JP | H05-062096 | 3/1993 |
| JP | H07-007368 U | 2/1995 |
| JP | H07-035503 U | 7/1995 |
| JP | H07-056322 U | 12/1995 |
| JP | 2009-019353 | 1/2009 |
| JP | 2013-258627 | 12/2013 |
| JP | 2014-047568 | 3/2014 |
| JP | 2014-129694 | 7/2014 |
| JP | 2014-198968 | 10/2014 |
| JP | 6029941 | 11/2016 |

* cited by examiner

ROAD MACHINE

RELATED APPLICATION

This application is a continuation of International Application PCT/JP2019/013735, filed on Mar. 28, 2019 and designated the U.S., which is based on and claims priority to Japanese Patent Application No. 2018-068045, filed on Mar. 30, 2018, with the Japan Patent Office. The entire contents of these applications are incorporated herein by reference.

BACKGROUND

1. Technical Field

The disclosures herein generally relate to a road machine.

2. Description of Related Art

A technology as known in the art for a road machine equipped with an imaging device uses a display device to display an image that is captured by the imaging device and that shows the inside of a hopper and a road surface situated immediately in front of a screed for presentation to an operator.

SUMMARY

According to an embodiment, a road machine includes a hopper, a screed, a measuring unit configured to measure an amount of pavement material inside the hopper or pavement material held in front of the screed, and a display device disposed in an operator's seat and configured to display the amount of pavement material measured by the measuring unit.

According to at least one embodiment, a road machine is provided that is capable of facilitating the operator's evaluation of the amount of pavement material inside a hopper or in front of a screed.

DETAILED DESCRIPTION

It is difficult for an operator to visually check, from the operator's seat of an asphalt finisher, the inside of a hopper and a road surface situated immediately in front of the screed. There is thus a possibility of failing to evaluate properly the amount of pavement material inside the hopper and the amount of pavement material kept in front of the screed.

Further, even when an image showing the inside of a hopper and a road surface in front of the screed is displayed to the operator, the operator may have difficulties properly evaluating the amount of pavement material based on the displayed image, depending on the work conditions such as during nighttime operations, for example.

According to an embodiment of the present disclosures, a road machine is provided that is capable of facilitating the operator's evaluation of the amount of pavement material inside a hopper or in front of a screed.

In the following, embodiments for implementing the invention will be described with reference to the accompanying drawings.

[Schematic Configuration of Road Machine]

With reference to FIG. 1, a description will be given of a schematic configuration of a road machine that is equipped with a pavement material quantity displaying system 100 (see FIG. 2).

Figure 1A:
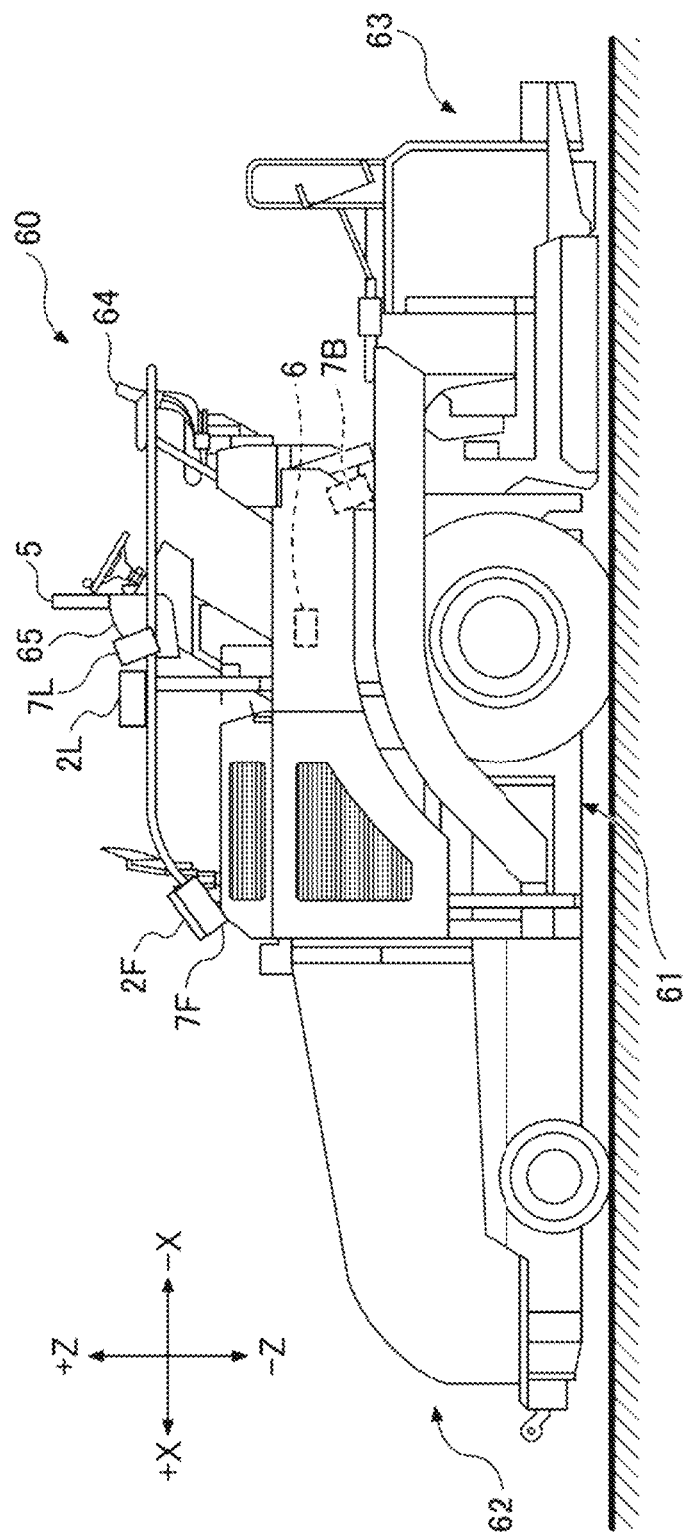
FIG. 1A is a drawing illustrating an example of the configuration of a road machine.
Figure 1B:
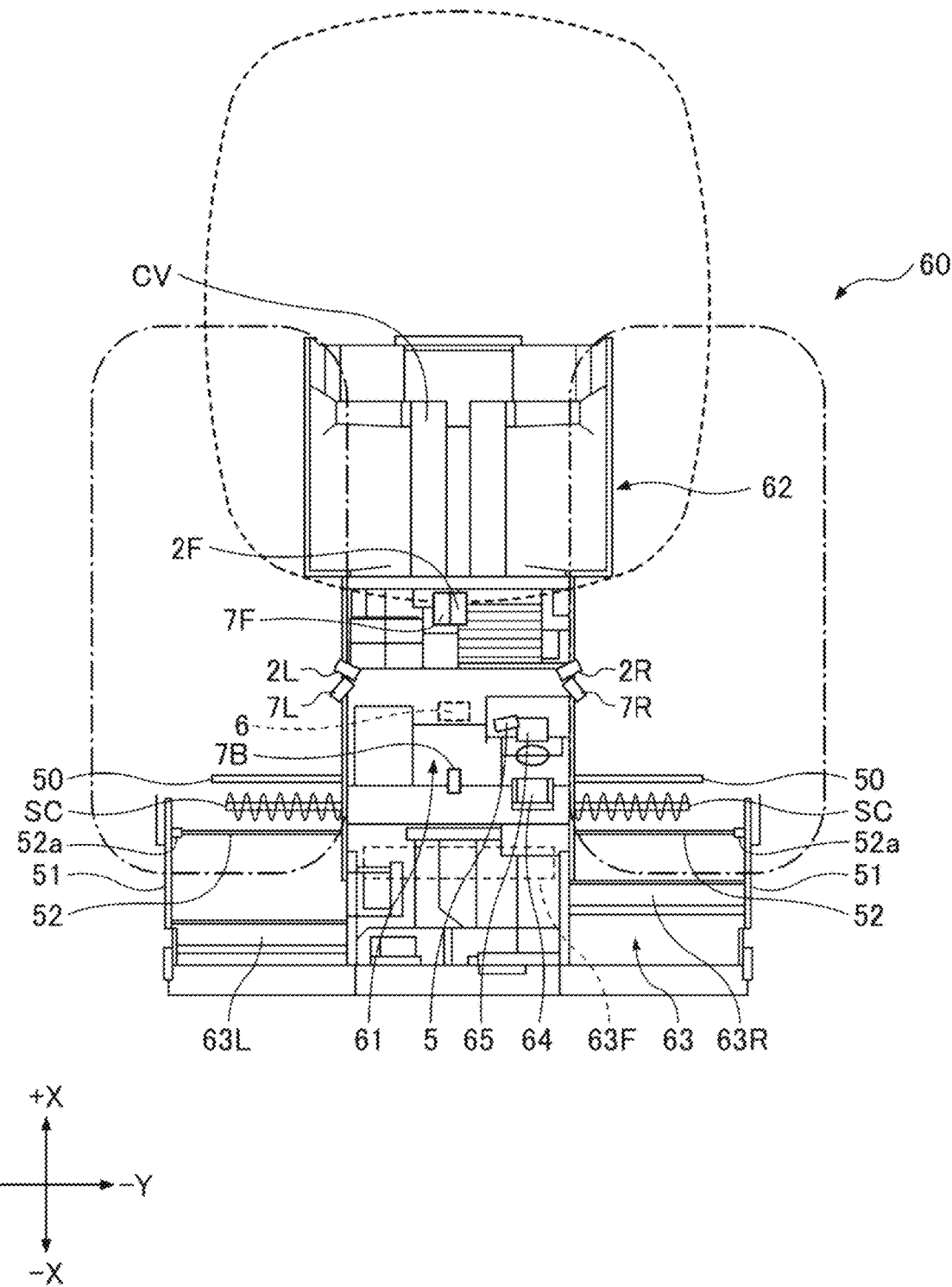
FIG. 1B is a drawing illustrating an example of the configuration of the road machine.
Figure 1C:
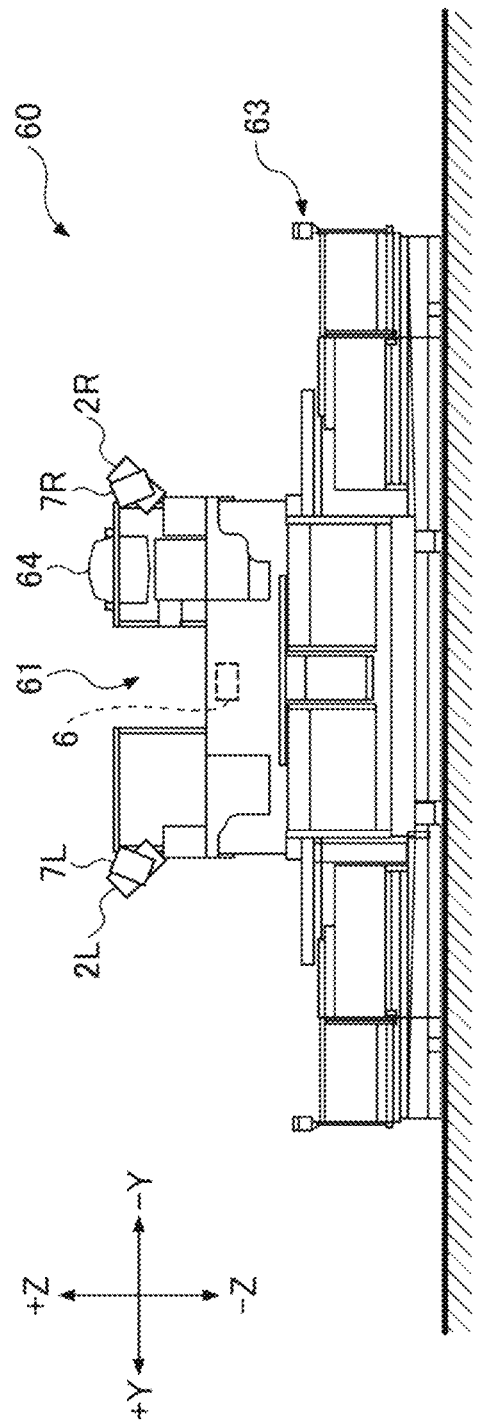
FIG. 1C is a drawing illustrating an example of the configuration of the road machine.

FIG. 1 (FIGS. 1A-1C) illustrates an example of the configuration of a road machine, and, specifically, illustrates an example of the configuration of an asphalt finisher 60, which is an example of a road machine. More specifically, FIGS. 1A-1C illustrate a side elevation view of the asphalt finisher 60 as viewed from the left (from the +Y side in the drawings), a plan view as viewed from the top (from the +Z side in the drawings), and a rear view as viewed from the rear (from the −X side in the drawings), respectively. In the following, the +X direction and the −X direction, the +Y direction and the −Y direction, and the +Z direction and the −Z direction in the drawings may be collectively referred to as an X-axis direction, a Y-axis direction, and a Z-axis direction, respectively.

The road machine equipped with the pavement material quantity displaying system 100 according to the present embodiment may be a guss asphalt finisher or the like using a guss asphalt composite.

The asphalt finisher 60 includes a tractor 61, a conveyor CV, a hopper 62, a screed 63, screws SC, retaining plates 50, side plates 51, moldboards 52, a cylinder 52c, an operator seat 64, and an operation panel 65.

The tractor 61 is a drive mechanism that drives the asphalt finisher 60 and tows the screed 63. The tractor 61 uses a driving hydraulic motor (not illustrated), for example, to rotate two or four wheels, thereby moving the asphalt finisher 60. The driving hydraulic motor is rotated by hydraulic oil supplied from a hydraulic pump driven by a prime mover such as a diesel engine (not illustrated).

The hopper 62 is provided at the front of the asphalt finisher 60, and serves as a mechanism for receiving pavement material for paving roads such as an asphalt mix or the like. The hopper 62 is configured to be opened and closed in the vehicle width direction (i.e., the Y-axis direction) by hydraulic cylinders (not illustrated), for example. In the open state, the hopper 62 supplies the pavement material therein to the conveyor CV disposed immediately below the center thereof. The hopper 62 is typically fully opened to accept pavement material from the bed of a dump truck. With this arrangement, the conveyor CV can supply the pavement material supplied from the center of the open hopper 62 to the screed 63. When the pavement material in the inside (more specifically in the center portion) decreases, the hopper 62 is closed so that the pavement material disposed near the inner walls on the right, left, and rear sides is collected toward the center portion. Subsequently, the hopper 62 is opened again, so that the conveyor CV can supply the pavement material collected toward the center of the hopper 62 to the screed 63.

The conveyor CV extends from the front of the asphalt finisher 60 to the area situated immediately in front of the screed 63 behind the hopper 62 in the space having a vertical span (i.e., in the Z-axis direction) between a road to be paved and the hopper 62. The conveyor CV supplies the pavement material supplied from the hopper 62 to the screed 63 as described above.

The hopper 62 and the conveyor CV as described above are an example of a work apparatus that places pavement material in front of the screed 63.

The screed 63 is a mechanical unit for laying and spreading the pavement material supplied by the conveyor CV to a road surface situated immediately in front thereof. The screed 63 is configured to be freely elevatable in the vertical direction (i.e., in the Z-axis direction) and to be freely extendable in the vehicle width direction (i.e., in the Y-axis direction) by hydraulic cylinders (not illustrated), for example. The screed 63 has a width larger than the width of the tractor 61 when extended in the width direction.

The screed 63 includes a front screed 63F, a left rear screed 63L, and a right rear screed 63R.

The left rear screed 63L and the right rear screed 63R are each configured to be freely extendable in the vehicle width direction, and are positioned with an offset from each other in the travel direction (i.e., in the X-axis direction) of the asphalt finisher 60. This arrangement allows the left rear screed 63L and the right rear screed 63R to avoid interfering with each other when extended and contracted in the vehicle width direction. Compared with the case in which no offset is provided, thus, the width of the left rear screed 63L and the width of the right rear screed 63R can be made wider. The screed 63 can thus extend longer in the width direction, allowing construction of a wider new pavement. A description in the following will be given with respect to the case in which the left rear screed 63L and the right rear screed 63R are each in an extended state.

The pavement material that is supplied by the conveyor CV to the center of the screed 63 in the vehicle width direction, i.e., to a road surface situated immediately in front of the front screed 63F, is spread by the screws SC toward outer positions in the vehicle width direction, i.e., toward the road surfaces situated immediately in front of the left rear screed 63L and the right rear screed 63R. The screws SC extend in the lateral direction from the road surface situated in front of the left rear screed 63L to the road surface situated in front of the right rear screed 63R at a position between the rear end of the conveyor CV and the screed 63 in the fore-and-aft direction (i.e., the X-axis direction).

The retaining plates 50 extend laterally to the right and to the left from beneath the side surfaces of tractor 61 such that the plate faces cover spaces in front of the right and left screws SC. The right and left retaining plates 50 hold the pavement material that is spread by the screws SC to the road surfaces on the right and on the left in the vehicle width direction, so that the pavement material does not spread forward away from the areas situated immediately in front of the left rear screed 63L and the right rear screed 63R.

The side plates 51 are disposed at outer positions relative to the right and left screws SC in the vehicle width direction, and hold the pavement material spread by the screws SC to the road surfaces on the right and on the left in the vehicle width direction, so that the pavement material does not spread laterally from the road surface situated immediately in front of the left rear screed 63L and the right rear screed 63R. The left side plate 51 extends forward from the left rear screed 63L, such that the plate face covers, from the left side (i.e., from the outer side in the vehicle width direction), a road surface area situated immediately in front of the left screw. SC and the left rear screed 63L. The right side plate 51 extends forward from the right rear screed 63R, such that the plate face covers, from the right side (i.e., from the outer side in the vehicle width direction), a road surface area situated immediately in front of the right screw SC and the right rear screed 63R.

The moldboard 52 is connected between the outer side surface of the tractor 61 and the inner plate face of the side plate 51 at the rear of each of the right and left screws SC. The left moldboard 52 is positioned such that the plate face thereof partitions a road surface area situated immediately in front of the left screw SC and the left rear screed 63L in the fore-and-aft direction. The right moldboard 52 is positioned such that the plate face thereof partitions a road surface area situated immediately in front of the right screw SC and the right rear screed 63R in the fore-and-aft direction.

The cylinder 52c moves the moldboard in the vertical direction. With this arrangement, the asphalt finisher 60 is able to adjust the amount of pavement material that is supplied through a gap between the lower end of the moldboard and the road surface and that stays in the road surface area situated immediately in front of the left rear screed 63L and the right rear screed 63R.

The operator seat 64 is disposed on the top of the tractor 61 and an operator of the asphalt finisher 60 sits thereon.

The operation panel. 65 is disposed immediately in front of the operator seat 64 at the top of the tractor 61 for receiving various operational inputs from the operator and for displaying various information to inform the operator.

[Configuration of Pavement Material Quantity Displaying System]

In the following, the configuration of the pavement material quantity displaying system 100 mounted on the asphalt finisher 60 will be described with reference to FIG. 2 in addition to FIGS. 1A through 1C.

Figure 2:
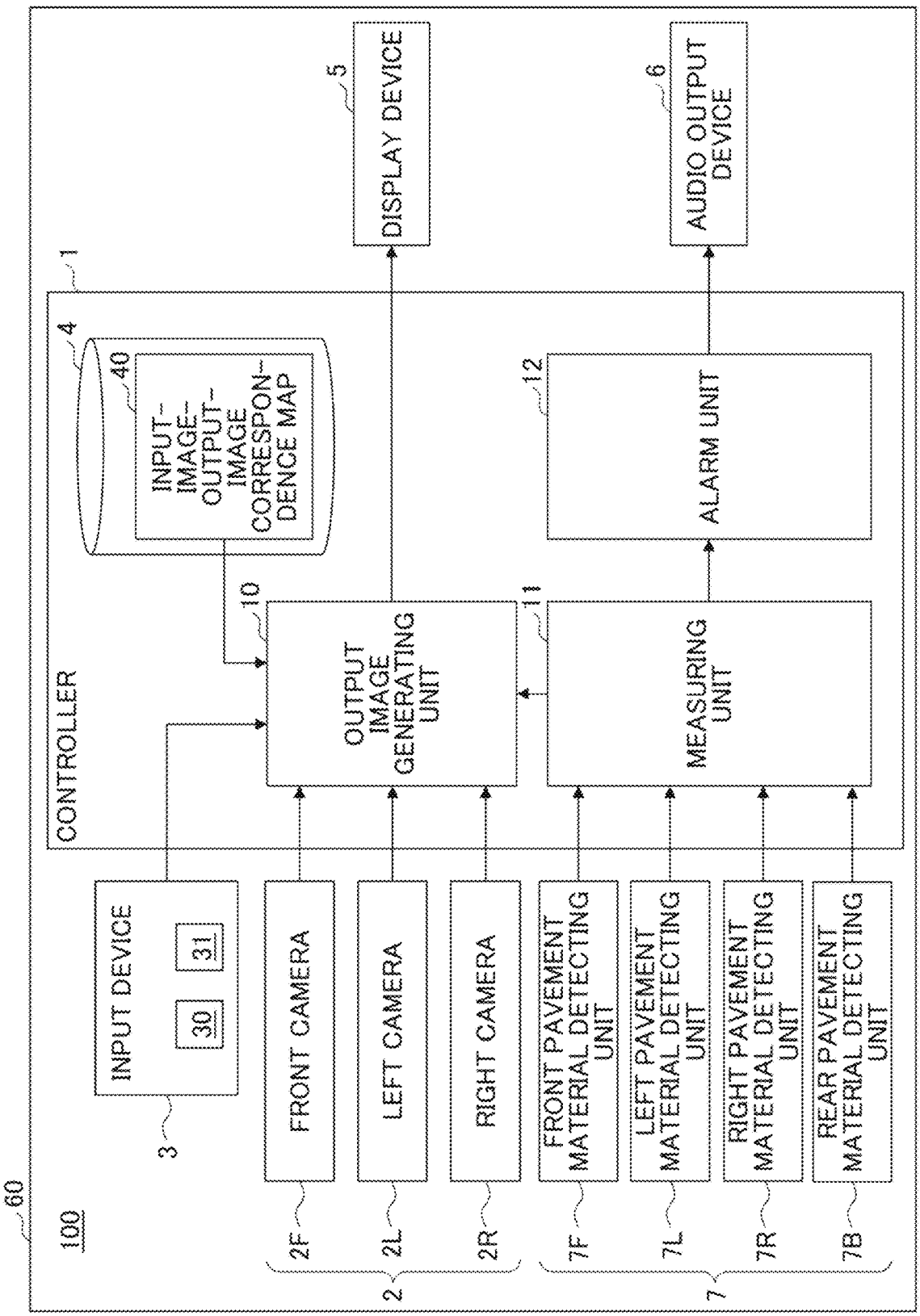
FIG. 2 is a drawing illustrating an example of the configuration of a pavement material quantity displaying system.

FIG. 2 is a drawing illustrating an example of the configuration of the pavement material quantity displaying system 100 mounted on the asphalt finisher 60.

The pavement material quantity displaying system 100 includes a controller 1, imaging devices 2, an input device 3, a storage device 4, a display device 5, an audio output device 6, and pavement material detecting units 7.

The controller 1 performs various control processes for the asphalt finisher 60. The controller 1 may be implemented mainly as a microcomputer including a CPU (central processing unit), a RAM (random access memory), a ROM (read only memory), a nonvolatile auxiliary memory device, a communication interface, and the like, for example. The controller 1 includes an output image generating unit 10, a measuring unit 11, and an alarm unit 12 as functional units that are realized by executing one or more programs stored in the ROM or auxiliary storage device on the CPU, for example.

The imaging devices 2 acquire input images (i.e., a captured image) for generating output images to be displayed on the display device 5. Each of the imaging devices 2 is a camera including an imaging element such as a CCD (charge-coupled device) or a CMOS (complementary metal-oxide-semiconductor), for example, and is mounted on the tractor 61 in such a manner as to capture the images of blind spot areas of an operator sitting on the operator seat 64. The operator's blind spot areas may include, for example, the inside space of the hopper 62 (especially a portion near the tractor 61), a space near the road surface close to the side of the asphalt finisher 60 (especially a road surface area situated immediately in front of the left rear screed 63L and the right rear screed 63R).

The imaging devices 2 include a front camera 2F, a left camera 2L, and a right camera 2R.

The front camera 2F, which is mounted at the top of the front end of the tractor 61 as illustrated in FIGS. 1A and 1B, captures an image of a predetermined imaging area (i.e., the area enclosed in a dashed line in the figure) including the inside of the hopper 62 and a road surface in front of the hopper 62.

The left camera 2L, which is mounted at the top of the left side of the tractor 61 as illustrated in FIGS. 1A through 1C, captures an image of a predetermined imaging area (i.e., the area enclosed in a dotted-and-dashed line on the left side of the figure) that includes a road surface extending from an area situated at the immediate left of the hopper 62 to an area situated immediately in front of the left rear screed 63L.

The right camera 2R, which is mounted at the top of the right side of the tractor 61 as illustrated in FIGS. 1B and 10, captures an image of a predetermined imaging area (i.e., the area enclosed in a dotted-and-dashed line on the right side of the figure) that includes a road surface extending from an area situated at the immediate right of the hopper 62 to an area situated immediately in front of the right rear screed 63R.

The imaging devices 2 (i.e., front camera 2F, left camera 2L, and right camera 2R) are attached to the asphalt finisher 60 via brackets, stays, bars, or the like, for example. For example, the imaging devices 2 may be attached to the tractor 61 via a mounting stay, may be attached directly to the tractor 61 without a mounting stay, or may be attached to the tractor 61 by being embedded in the tractor 61. The same applies to the pavement material detecting units 7, which will be described later.

During the operation of the asphalt finisher 60, each of the imaging devices 2 outputs an acquired image (i.e., input image) to the controller 1 at predetermined intervals (for example, 1/30 seconds). Further, a wide-angle lens or a fish-eye lens may be attached to the imaging devices 2. In this case, the imaging devices 2 may output corrected input images to the controller 1 after correcting apparent distortion, perspective deformation, and the like caused by using these lenses. Alternatively, the imaging devices 2 may output input images without correcting such apparent distortion and perspective deformation. In this case, the controller 1 corrects such apparent distortion and perspective deformation.

The imaging devices 2 may be mounted at any position different from the front, right side, and left side of the tractor 61, provided that they can capture images of zones corresponding to the operator's blind spot areas such as the inside space of the hopper 62, the space near the road surface close to the side of the asphalt finisher 60, and the like as previously described. The imaging devices 2 may alternatively be mounted on the hopper 62 or on the screed 63, for example, rather than on the tractor 61, provided that zones corresponding to the operator's blind spot areas described above can be captured in images.

The input device 3 receives various kinds of information that is supplied by the operator as operational input to the pavement material quantity displaying system 100. The input device 3 may include any desired type of operation units such as a touch panel, buttons, switches, dials, and the like, for example. The input device 3 includes a display selector switch 30 and a screw dial 31.

The display selector switch 30 is a switch-type operation unit for switching output image types displayed on the display device 5. The display selector switch 30 may receive the operator's operational input for switching output images when two or more output images among the output images illustrated in FIG. 3 through FIG. 5 as will be described later can be displayed on the display device 5.

The screw dial 31 is a dial-type operation unit for adjusting the rotational speed of the screws SC.

The storage device 4 stores various information. The storage device 4 may be a nonvolatile memory that is integrated into the controller 1, i.e., the embedded memory of the controller 1, for example.

The storage device 4 may alternatively be disposed outside the controller 1, and may be communicatively coupled to the controller 1 through a one-to-one communication line, an internal network (i.e., LAN: local area network) of the asphalt finisher 60, or the like.

The display device 5, which is installed at a position where the display device 5 is easily viewed by the operator sitting on the operator seat 64, displays various information. The display device 5, which is a liquid crystal display installed in the operation panel 65, for example, displays various images (i.e., output images) output from the controller 1.

The audio output device 6 is disposed in the proximity of the operator seat 64 to inform the operator of various information by voice under the control of the controller 1. The audio output device 6 is a speaker, a buzzer, and the like, for example.

The pavement material detecting units 7 detect pavement material in the inside space of the hopper 62 and pavement material held in front of the front screed 63F, the left rear screed 63L, and the right rear screed 63R. Specifically, the pavement material detecting units 7 detect the positions of the surfaces of the pavement material in the inside space of the hopper 62 and the pavement material held in front of the front screed 63F, the left rear screed 63L, and the right rear screed 63R. With this arrangement, the controller 1 measures (i.e., calculates) the amount of pavement material held by the hopper 62 based on the known positions of the inner walls and bottom surface of the hopper 62 and the detected positions of the surface of the pavement material inside the hopper 62, as will be described later. Further, the controller 1 measures (calculates) the amount of pavement material held in front of the front screed 63F, the left rear screed 63L, and the right rear screed 63R based on the known position of the road surface and the detected positions of the surfaces of pavement material on the road surface situated immediately in front of the front screed 63F, the left rear screed 63L, and the right rear screed 63R, as will be described later, The pavement material detecting unit 7 include a front pavement material detecting unit 7F, a rear pavement material detecting unit 7B, a left pavement material detecting unit 7L, and a right pavement material detecting unit 7R.

As illustrated in FIGS. 1A and 1B, the front pavement material detecting unit 7F is attached, similarly to the front camera 2F, to the top of the front end of the tractor 61, thereby detecting the pavement material retained in the inside space of the hopper 62 in front of the tractor 61.

The rear pavement material detecting unit 7B is attached to the rear end face of the tractor 61 as illustrated in FIGS. 1A and 1B to detect pavement material situated between the rear end of the tractor 61 and the front screed 63F, i.e., the pavement material at the outlet of the conveyor CV.

The left pavement material detecting unit 7L is attached to the top of the left side of the tractor 61, as illustrated in FIGS. 1A through 1C, to detect pavement material held in front of the left rear screed 63L.

The right pavement material detecting unit 7R is attached to the top of the right side of the tractor 61, as illustrated in FIGS. 1B and 1C, to detect pavement material held in front of the right rear screed 63R.

The pavement material detecting units 7, which may be a millimeter-wave radar, an ultrasonic radar, a LIDAR (light detection and ranging), a stereo camera, or the like, for example, output detection results at predetermined detection intervals, which are received by the controller 1.

It may be noted that, when a stereo camera is employed to detect the position of a surface of pavement material, the pair of front camera 2F and front pavement material detecting unit 7F, the pair of left camera 2L and left pavement material detecting unit 7L, and the pair of right camera 2R and right pavement material detecting unit 7R may each be implemented as a single stereo camera.

The output image generating unit 10 generates output images to be displayed on the display device 5. For example, the output image generating unit 10 refers to an input-image-output-image correspondence map 40 stored in the storage device 4 to provide correspondences between coordinates on the input image plane on which an image (i.e., input image) captured by the imaging devices 2 is placed and coordinates on the output image plane on which an output image is placed. The output image generating unit 10 generates an output image by providing correspondences between the values of pixels in the output image (e.g., brightness value, hue value, saturation value, and the like) and the values of pixels in the input image, followed by displaying the generated output image on the display device 5.

The input-image-output-image correspondence map 40 represents correspondence relationships between coordinates on the input image plane and coordinates on the output image plane, and is stored in the storage device 4 in such a manner as to be accessible by the output image generating unit 10. Such corresponding relationships may be preset based on various parameters such as the optical center, focal length, CCD size, optical axis direction vector, camera horizontal direction vector, projection mode, and the like of the imaging devices 2. The corresponding relationships may be set such that apparent distortion and perspective deformation do not appear in the output image when the input image contains apparent distortion and perspective deformation. In such a case, a group of coordinates constituting a non-rectangular area on the input image plane is associated with a group of coordinates constituting a rectangular area on the output image plane. Further, the corresponding relationships may be set such that a group of coordinates constituting a rectangular area on the input image plane directly correspond to a group of coordinates constituting a rectangular area on the output image plane when apparent distortion and perspective deformation in the input image have already been corrected at the time of acquisition of the input image.

The output image generating unit 10 causes the display device 5 to display captured images (i.e., input images) from the imaging devices 2 as well as the amount of pavement material held inside the hopper 62 together with the amount of pavement material held in front of the front screed 63F, the left rear screed 63L, and the right rear screed 63R as measured by the measuring unit 11. In doing so, the output image generating unit 10 updates the amount of pavement material displayed on the display device 5 each time the amount of pavement material is measured by the measuring unit 11, as will be described later. Namely, the output image generating unit 10 successively updates the display contents of the display device 5 according to changes in the amount of pavement material, thereby allowing the display device 5 to show the state of changes (i.e., the state of transitions) with respect to the amount of pavement material. With this arrangement, the pavement material quantity displaying system 100 allows the operator to evaluate the state of changes (i.e., state of transitions) with respect to the amount of pavement material inside the hopper 62 or in front of the screed 63.

Details of the output images generated by the output image generating unit 10 and displayed on the display device 5 will be described later (see FIG. 3 through FIG. 5).

The measuring unit 11 measures the amounts of pavement material based on the positions of surfaces of pavement material inside the hopper 62 and pavement material held in front of the front screed 63F, the left rear screed 63L, and the right rear screed 63R as detected by the pavement material detecting units 7, Specifically, the measuring unit 11 calculates physical quantities regarding the amounts of pavement material for each predetermined control cycle based on detection results successively provided from the pavement material detecting units 7.

The measuring unit 11 may perform part or all of the processes listed in the following examples.

For example, the measuring unit 11 calculates the height of pavement material inside the hopper 62, i.e., the height from the bottom surface of the hopper 62 to the surface of pavement material, in a predetermined area extending over a partial or entire area inside the hopper 62. Specifically, the measuring unit 11 may calculate the height of pavement material inside the hopper 62 through a predetermined conversion process based on the known coordinates of the bottom surface of the hopper 62 as viewed from the front pavement material detecting unit 7F and the detected coordinates of the surface of pavement material. The measuring unit 11 also calculates the heights of pavement material held on a road surface situated immediately in front of the front screed 63F, the left rear screed 63L, and the right rear screed 63R, i.e., the heights from the road surface to the surfaces of pavement material held in front of the front screed 63F, the left rear screed 63L, and the right rear screed 63R. Specifically, the measuring unit 11 may calculate the heights of pavement material held by the front screed 63F, the left rear screed 63L, and the right rear screed 63R through a predetermined conversion process based on the known coordinates of road surfaces viewed from the rear pavement material detecting unit 7B, the left pavement material detecting unit 7L, and the right pavement material detecting unit 7R and the detected coordinates of the surfaces of pavement material.

Further, the measuring unit 11 calculates an average height, a minimum height, a maximum height, and the like of pavement material in the predetermined area based on the calculated heights (or distribution thereof) of pavement material over the predetermined area inside the hopper 62, for example. Similarly, the measuring unit 11 calculates an average height, a minimum height, a maximum height, and the like of pavement material in each predetermined area based on the calculated heights (or distribution thereof) of pavement material in the predetermined area of the road surface situated immediately in front of the front screed 63B, the left rear screed 63L, and the right rear screed 63R.

Moreover, the measuring unit 11 may use an integration process or the like to calculate the volume (i.e., cubic content) of pavement material held inside the hopper 62 based on the calculated distribution of heights of pavement material inside the hopper 62 over the predetermined area within the hopper 62, and may further calculate the weight from the calculated volume, for example. In addition, the measuring unit 11 may calculate the volume (i.e., cubic content) of pavement material held by each of the front screed 63F, the left rear screed 63L, and the right rear screed 63R based on the calculated distribution of heights of pavement material over the predetermined area of a road surface situated immediately in front of a respective one of the front screed 63F, the left rear screed 63L, and the right rear screed 63R, and may further calculate the weight from the calculated volume.

It may be noted that the measuring unit 11 may measure only some among the amount of pavement material inside the hopper 62 and the amounts of pavement material in front of the front screed 63F, the left rear screed 63L, and the right rear screed 63R. In this case, some of the front pavement material detecting unit 7F, the rear pavement material detecting unit 7B, the left pavement material detecting unit 7L, and the right pavement material detecting unit 7R may be omitted, as long as they are not the pavement material detecting unit 7 corresponding to the object measured by the measuring unit 11. In this case, further, only some among the amount of pavement material inside the hopper 62 and the amounts of pavement material in front of the front screed 63F, the left rear screed 63L, and the right rear screed 63R may be reported by the alarm unit 12 to the operator, as will be described later.

The alarm unit 12 uses the audio output device 6 to inform the operator of the fact that the amount of pavement material held inside the hopper 62, the amount of pavement material held in front of the front screed 63F, the amount of pavement material held in front of the left rear screed 63L, or the amount of pavement material held in front of the right rear screed 63R deviates from a predetermined range. With this arrangement, the pavement material quantity displaying system 100 allows the operator to properly evaluate a situation in which the amount of pavement material inside the hopper 62 is excessively reduced or the amount of pavement material held in front of the front screed 63F is excessively increased, for example. Upon properly evaluating the situation, the operator is able to take a proper action such as closing the hopper 62, for example. The pavement material quantity displaying system 100 may also allow the operator to properly evaluate a situation in which the amount of pavement material held in front of the screed 63 is being excessively reduced or increased, for example. Upon properly evaluating the situation, the operator may thus be able to take a proper action such as using the screw dial 31 to increase or decrease the rotational speed of the screws SC, causing the moldboard 52 to move up or down, or the like.

The predetermined range may be defined as a standard range required by the asphalt finisher 60 to perform proper construction of road paving operations. Also, the predetermined range may, of course, be different for the pavement material held inside the hopper 62 and for the pavement material held in front of the front screed 63F, the left rear screed 63L, or the right rear screed 63R.

The alarm unit 12 may perform some or all of the processes listed in the following examples.

For example, the alarm unit 12 notifies the operator when the height of pavement material deviates from the predetermined range at any position or a particular position (I.e., position defined in the X-axis direction and the Y-axe direction) within the inside space of the hopper 62, within the road surface situated immediately in front of the front screed 63F, within the road surface situated immediately in front of the left rear screed 63L, or within the road surface situated immediately in front of the right rear screed 63R.

As another example, the alarm unit 12 notifies the operator when the average height, the minimum height, the maximum height, or the like as measured by the measuring unit 11 in the predetermined area deviates from the predetermined range inside the hopper 62, in the road surface situated immediately in front of the front screed 63F, in the road surface situated immediately in front of the left rear screed 63L, or in the road surface situated immediately in front of the right rear screed 63R.

As yet another example, the alarm unit 12 notifies the operator when the volume or weight of pavement material deviates from the predetermined range in a predetermined partial area or the entire area of the inside of the hopper 62, of the road surface situated immediately in front of the front screed 63F, of the road surface situated immediately in front of the left rear screed 63L, or of the road surface situated immediately in front of the right rear screed 63R.

The alarm unit 12 may use image information on the display device 5 for notification, instead of or in addition to using the audio of the audio output device 6 for notification.

[Detail of Output Image]

In the following, the detail of output images displayed on the display device 5 will be described with reference to FIGS. 3 to 5.

Figure 3:
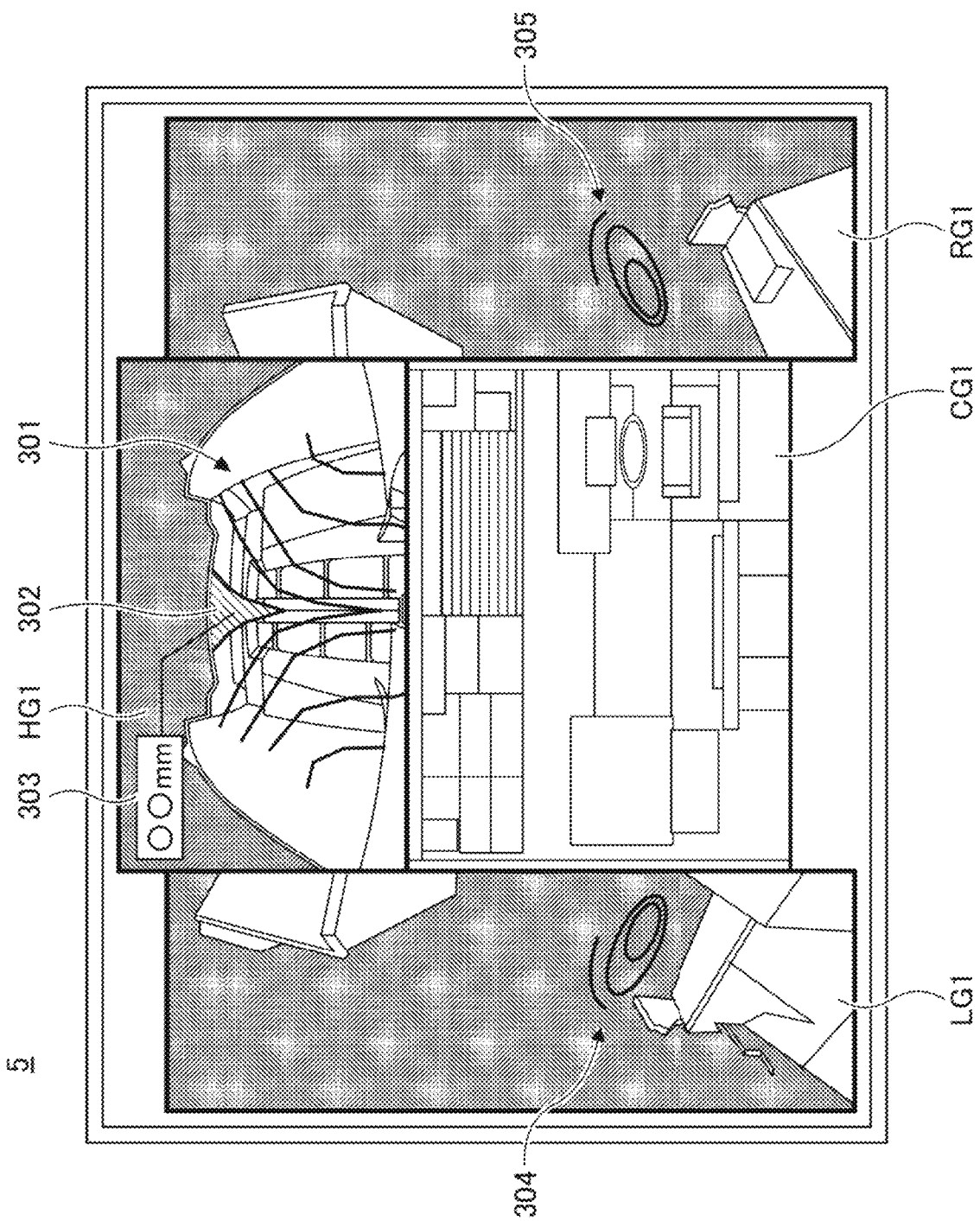
FIG. 3 is a drawing illustrating an example of an output image displayed on a display device.
Figure 4:
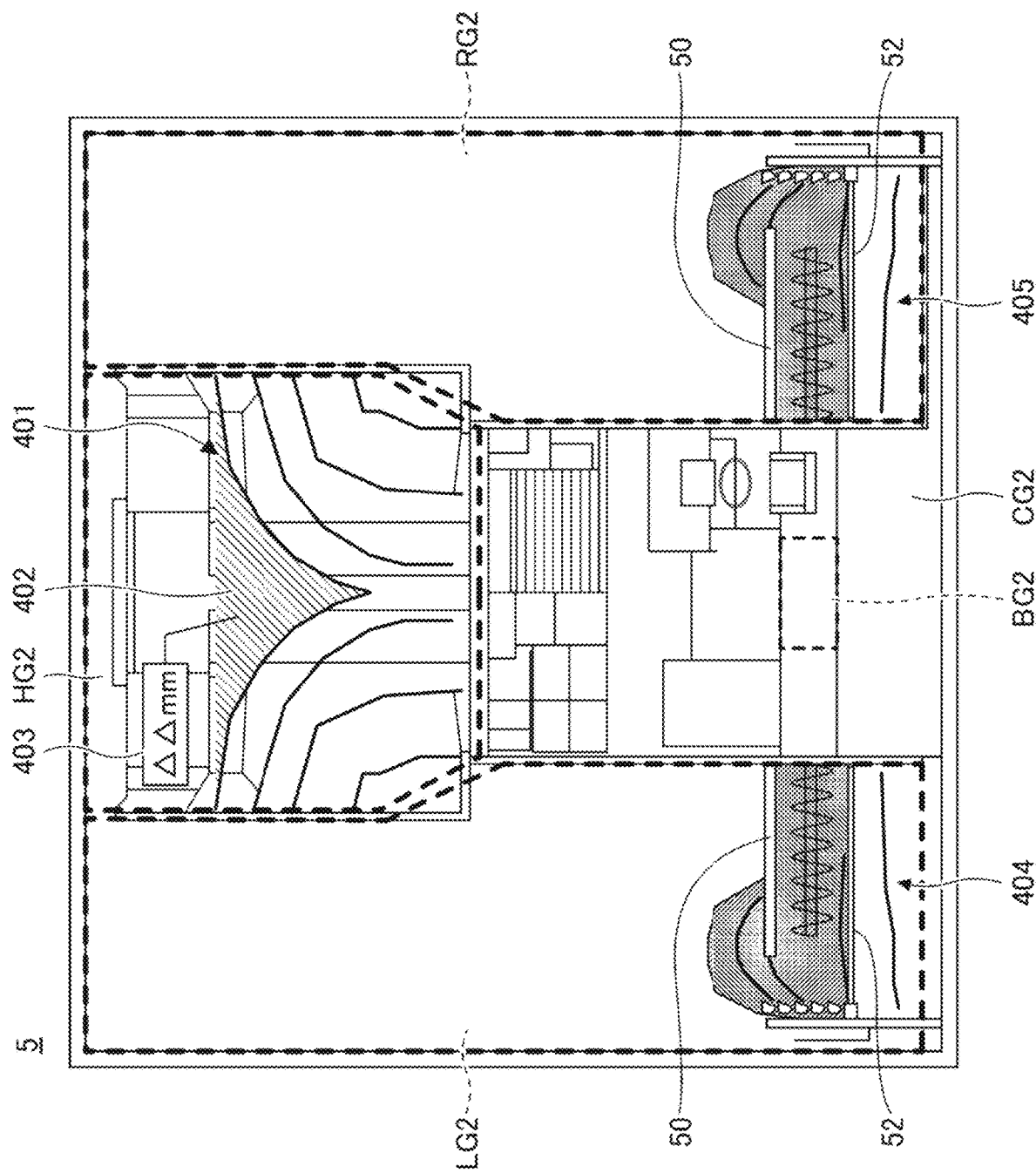
FIG. 4 is a drawing illustrating another example of an output image displayed on the display device.
Figure 5:
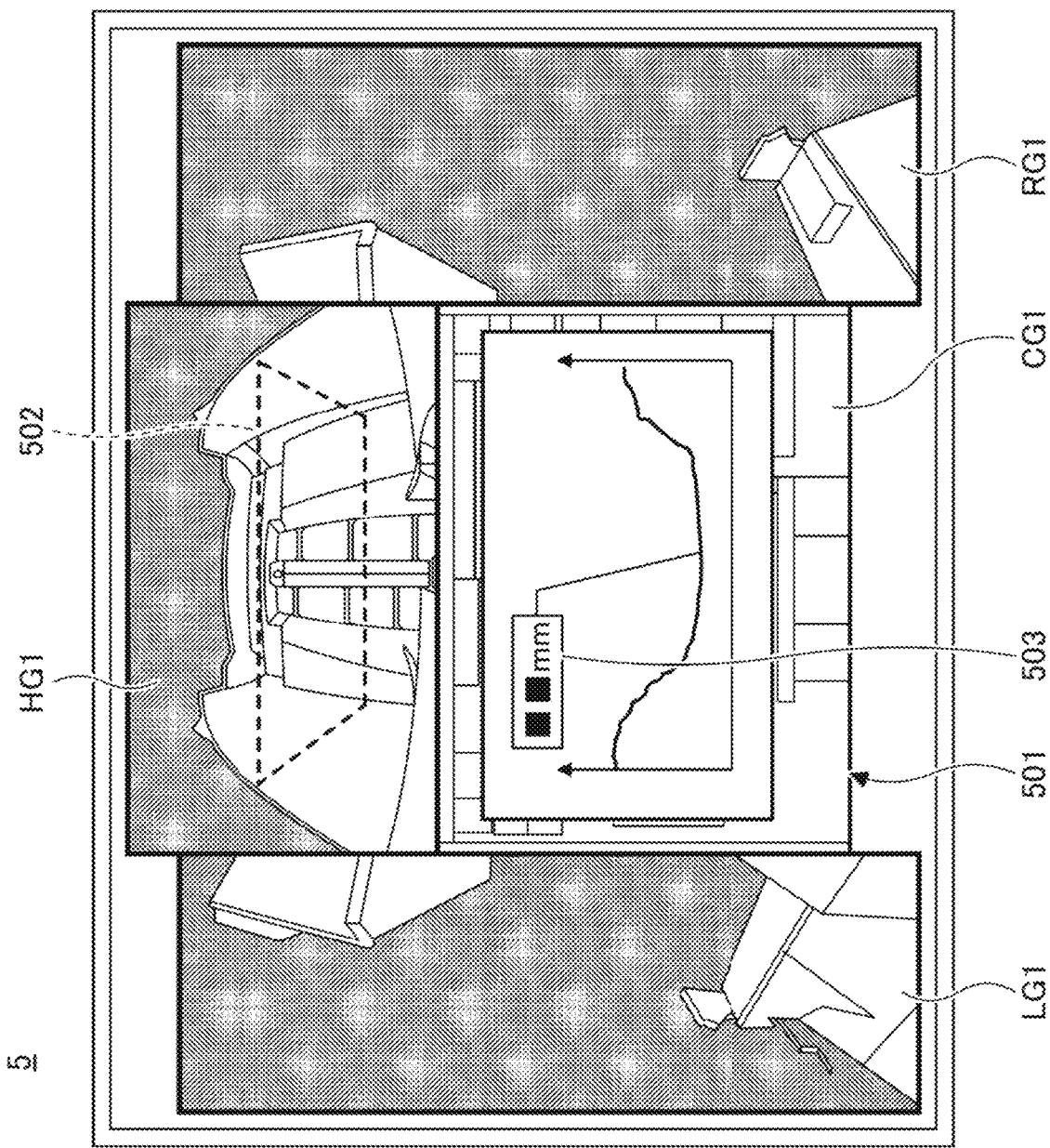
FIG. 5 is a drawing illustrating yet another example of an output image displayed on the display device.

The output images illustrated in FIG. 3 through FIG. 5 may all be configured to be viewable on the display device 5, or only some of these may be configured to be viewable on the display device 5.

FIG. 3 is a drawing illustrating an example of an output image displayed on the display device 5.

As illustrated in FIG. 3, the output image of the present example includes a hopper image HG1, a left surround image LG1, a right surround image RG1, and an illustration image CG1.

The hopper image HG1 is generated based on the captured image (i.e., input image) of the front camera 2F. In the present example, the hopper image HG1 is an image showing the state of the inside of the hopper 62 when the hopper 62 is looked down from the operator seat of the tractor 61. The hopper image HG1 is generated by cutting out a portion of the input image of the front camera 2F, for example, and is placed at the top center of the output image.

The left surround image LG1 is generated based on the captured image (i.e., input image) of the left camera 2L. In the present example, the left surround image LG1 is an image showing the state of a surrounding area on the left when the surrounding area on the left side of the asphalt finisher 60 (i.e., left surround area) is looked down from the operator seat of the tractor 61. The left surround image LG1 also includes an image of the left end of the screed 63 (i.e., the left rear screed 63L) and an image of the left end of the hopper 62. The left surround image LG1 is generated by cutting out a portion of the input image of the left camera 2L, performing distortion correction, and then performing image rotation processing, for example, and is placed at the left end of the output image.

The right surround image RG1 is generated based on the captured image (i.e., input image) of the right camera 2R. In the present example, the right surround image RG1 is an image showing the state of a surrounding area on the right when the surrounding area on the right side of the asphalt finisher 60 (i.e., the right surround area) is looked down from the tractor 61. The right surround image RG1 also includes an image of the right end of the screed 63 (i.e., the right rear screed 63R) and an image of the right end of hopper 62. The right surround image RG1 is generated by cutting out a portion of the input image of the right camera 2R, performing distortion correction, and then performing image rotation processing, for example, and is placed at the right end of the output image.

The distortion correction is a known image process for correcting apparent distortion or perspective deformation caused by using a wide-angle lens or the like. The image rotation processing is a known image process for aligning the direction of both the left surround image LG1 and the right surround image RG1 with the forward travel direction of the asphalt finisher 60 (i.e., the upper side of the screen of the display device 5). For example, the correspondence relationships between coordinates on the input image plane and coordinates on the output image plane regarding each input image of the left camera 2L and the right camera 2R are stored in the input-image-output-image correspondence map 40, with the effects of distortion correction and image rotation processing having been incorporated. Further, distortion correction and image rotation processing may be performed on the hopper image HG1.

The illustration image CG1 is a computer graphics image of the tractor 61. In the present example, the illustration image CG1 is placed at the bottom center of the output image.

As described above, the display device 5 operating under the control of the output image generating unit 10 displays an output image in which the hopper image HG1, the left surround image LG1, and the right surround image RG1 are disposed in such a manner as to allow the operator to recognize that the forward direction of the asphalt finisher 60 coincides with the upper end of the screen of the display device 5. Specifically, the display device 5 displays, for presentation to the operator, an output image having the illustration image CG1 at the center thereof and representing the asphalt finisher 60 and the surroundings thereof, as appear when looked down from the operator in the operator seat. This allows the operator to have an intuitive understanding of the positional relationship between the asphalt finisher 60 and surrounding objects.

In the present example, the hopper image HG1, the left surround image LG1, and the right surround image RG1 are placed adjacent to each other as separate images. Alternatively, the three images may be merged into one seamless image. In this case, image processing may be applied to prevent object images from disappearing in the area where the view area of the front camera 2F and the view area of the left camera 2L or the right camera 2R overlap. The same will apply in the case of the hopper image HG1, the left surround image LG1, and the right surround image RG1 of FIG. 5, which will be described later.

In the present example, the amounts of pavement material inside the hopper 62, in front of the left rear screed 63L, and in front of the right rear screed as measured by the measuring unit 11 are displayed and superimposed on the hopper image HG1, the left surround image LG1, and the right surround image RG1, respectively.

In the hopper image HG1, a contour diagram (i.e., topographic diagram) 301 illustrating the distribution of pavement material inside the hopper 62 is superimposed. The contour diagram 301 illustrates the distribution of heights of pavement material relative to positions within the hopper 62 (e.g., positions in the X-axis direction and the Y-axis direction). With this arrangement, the pavement material quantity displaying system 100 allows the operator to properly evaluate the amount of pavement material inside the hopper 62, specifically the distribution of heights of pavement material.

Especially when the surrounding environment is dark as in the case of nighttime operations, the operator may have difficulty recognizing the boundary between pavement material and the surrounding darkness captured in the hopper image HG1, which creates a risk of failing to evaluate the amount or distribution of pavement material. However, the pavement material quantity displaying system 100 displays the contour diagram 301, thereby allowing the operator to properly evaluate the amount and distribution of pavement material even in the situation as noted above. As a result, the operator is able to evaluate a situation in which the amount of pavement material is rapidly decreasing as indicated by excessively short intervals between the same-elevation contour lines around the center of the hopper 62 where the conveyor CV is disposed, followed by taking a proper action such as closing the hopper 62.

In the contour diagram 301, heights represented by and intervals set between contour lines may be determined in advance, or may be configurable as desired in accordance with predetermined operational inputs into the input device 3 given by the operator. The contour lines of the contour diagram 301 may differ in color, thickness, line type, and the like, depending on the represented heights. The same applies to contour diagrams 304 and 305 as well as contour diagrams. 401, 404, and 405 illustrated in FIG. 4, which will be described later.

In the present embodiment, the display device 5 uses the contour diagram 301 to represent the distribution of pavement material quantities. Alternatively, other visualization methods may be used to represent the distribution of pavement material quantities. For example, the display device 5 may use a heat map or the like to represent the distribution of pavement material quantities.

Further, the hopper image HG1 has a highlighted image 302 superimposed thereon that is highlighted by use of a color (e.g., red) or pattern easily noticeable by the operator. The highlighted image 302 indicates the area (specifically, the area represented as a positional range in the X-axis direction and the Y-axis direction) inside the hopper 62 where the amount (specifically, the height) of pavement material inside the hopper 62 is below a predetermined reference level (hereinafter referred to as a "hopper reference level"). With this arrangement, the pavement material quantity displaying system 100 allows the operator to properly evaluate the excessive shortage of pavement material and the position where the shortage occurs inside the hopper 62. Having evaluated the situation, the operator is thus able to take a proper action such as closing the hopper 62, for example.

The hopper reference level for determining whether or not to display the highlighted image 302 may be determined in advance, or may be configurable as desired in accordance with predetermined operational inputs into the input device 3 given by the operator. Further, the above-noted hopper reference level may differ depending on the position inside the hopper 62. For example, different hopper reference levels may be used for the center area, where the pavement material is relatively likely to decrease, and for the areas close to the inner walls, where the pavement material is relatively unlikely to decrease. The hopper reference level may be applied only to specific areas inside the hopper 62. Namely, the highlighted image 302 may be configured to be displayed only in particular areas where the height of pavement material is more likely to decrease than other areas due to the supply of pavement material to the conveyor CV, for example. Hereinafter, the same applies to a first screed reference level and a second screed reference level for the left surround image LG1 and the right surround image RG1, respectively.

Moreover, the hopper image HG1 may have a pop-up 303 superimposed thereon that shows the numerical value of a feature quantity relating to the amount of pavement material at a given position or in a given area inside the hopper 62. Namely, the hopper image HG1 has a feature quantity superimposed thereon that relates to the amount of pavement material associated with a position inside the hopper 62 captured in the hopper image HG1. In this example, the pop-up 303 is associated with such a position by a lead line extending from a specific position within the area corresponding to the highlighted image 302. The hopper image HG1 may have a pop-up 303 superimposed thereon that indicates the numerical value of a feature quantity such as the height of pavement material at a particular position or a statistical quantity in a particular area (e.g., average height, minimum height, maximum height, volume, or weight). With this arrangement, the pavement material quantity displaying system 100 allows the operator to evaluate the amount of pavement material inside the hopper 62 with a specific numerical value.

A specific position, area or the like associated with a feature quantity displayed in the output image may be determined in advance, or may be configurable as desired in accordance with predetermined operational inputs into the input device 3 given by the operator. In this case, a touchscreen panel mounted on the screen of the display device 5 may be used as the input device 3, so that the operator performs a touch gesture on the screen of the display device 5 on the hopper image HG1 to set such a position or area. Hereinafter, the same applies to pop-ups 403 and 503 illustrated in FIG. 4 and FIG. 5, respectively.

It may be noted that a feature quantity relating to the amount of pavement material may be displayed in another form such as a graph form, a gauge form, or the like, instead of or in addition to displayed as a numerical value. Hereinafter, the same applies to the case of FIG. 4 and FIG. 5. The pop-up 303 may be displayed outside the hopper image HG1 such as on the illustration image CG1, for example, as long as the pop-up 303 is associated with the position inside the hopper 62. Hereinafter, the same applies hereinafter the case illustrated in FIG. 4.

The left surround image LG1 and the right surround image RG1 have the contour diagrams 304 and 305 superimposed thereon, respectively, that illustrate the distributions of pavement material held in front of the left rear screed 63L and the right rear screed 63R, respectively. With this arrangement, the pavement material quantity displaying system 100 allows the operator to properly evaluate the amount of pavement material held in front of the left rear screed 63L and the right rear screed 63R, specifically the distribution of heights of pavement material. It may particularly be noted that, by displaying the contour diagrams 304 and 305, the pavement material quantity displaying system 100 allows the operator to properly evaluate the amount and distribution of pavement material even in a dark environment such as at night. More specifically, the pavement material quantity displaying system 100 allows the operator to evaluate the amount of pavement material in both an area in front of the moldboard 52 (hereinafter referred to as the "area ahead of the moldboard") and an area in rear of the moldboard 52 (hereinafter referred to as the "area behind the moldboard") within the road surface area extending between the screws SC and both of the left rear screed 63L and the right rear screed 63R. Namely, the operator is able to properly evaluate how the amount of pavement material is rapidly decreasing or increasing in the area ahead of the moldboard, for example, followed by taking a proper action such as increasing or decreasing the rotational speed of the screws SC by use of the screw dial 31. Further, the operator may properly evaluate how the amount of pavement material is rapidly decreasing or increasing in the area behind the moldboard, for example, followed by taking a proper action such as raising or lowering the moldboard 52.

Like the hopper image HG1, the left surround image LG1 and the right surround image RG1 may have a highlighted image superimposed thereon that indicates the area in front of the left rear screed 63L and the right rear screed 63R, respectively, where the height of pavement material falls below the first predetermined reference level (hereinafter referred to as the "first screed reference level"). Moreover, the left surround image LG1 and the right surround image RG1 may have a highlighted image superimposed thereon that indicates the area in front of the left rear screed 63L and the right rear screed 63R, respectively, where the height of pavement material exceeds the second predetermined reference level (hereinafter referred to as the "second screed reference level") higher than the first screed reference level. Namely, each of the left surround image LG1 and the right surround image RG1 may have a highlighted image superimposed thereon that indicates the area in front of the screed 63 where the height of pavement material deviates from the predetermined range defined by the first and second screed reference levels. Hereinafter, the same applies to the left surround image LG2 and the right surround image RG2 of FIG. 4, which will be described later. With this arrangement, the pavement material quantity displaying system 100 allows the operator to properly evaluate how and where the amount of pavement material is excessively reduced or excessively supplied in the road surface area situated immediately in front of the screed 63, specifically in both the area ahead of the moldboard and the area behind the moldboard. Having evaluated the situation of the area ahead of the moldboard, for example, the operator is able to take a proper action such as increasing or decreasing the rotational speed of the screws SC by use of the screw dial 31. Having evaluated the situation of the area behind the moldboard, for example, the operator is able to take a proper action such as raising or lowering the moldboard 52.

Like the hopper image HG1, the left surround image LG1 and the right surround image RG1 may have a pop-up superimposed thereon that shows a feature quantity relating to the amount of pavement material held in front of the left rear screed 63L and the right rear screed 63R, respectively. Hereinafter, the same applies to the left surround image LG2 and the right surround image RG2 of FIG. 4, which will be described later. With this arrangement, the pavement material quantity displaying system 100 allows the operator to evaluate the amount of pavement material held in front of the screed 63 with specific numerical values.

In the present example described above, the display device 5 operating under the control of the output image generating unit 10 displays the amount of pavement material measured by the measuring unit 11 inside the hopper 62 or in front of the screed 63, such that the displayed amounts are associated with a position inside the hopper 62 or within the road surface in front of the screed 63. Specifically, the display device 5 displays and superimposes the distribution of amounts (heights) of pavement material measured by the measuring unit 11 on the images captured by the imaging devices 2 (more specifically, the images generated from the input images and showing the inside of the hopper 62 as well as the left surround area and the right surround area as looked down from the tractor 61). With this arrangement, the pavement material quantity displaying system 100 allows the operator to properly evaluate the amount of pavement material, specifically the amounts of pavement material at various positions, i.e., the distribution thereof, inside the hopper 62 and in front of the screed 63.

In the present example, further, the display device 5 displays a feature quantity measured by the measuring unit 11 in association with a position inside the hopper 62 or within the road surface area situated immediately in front of the screed 63 in the captured images of the imaging devices 2 (i.e., the hopper image HG1, the left surround image LG1, or right surround image RG1). With this arrangement, the pavement material quantity displaying system 100 allows the operator to evaluate the amount of pavement material, specifically the height of pavement material at a specific position, or the feature quantity such as an average height, a maximum height, a minimum height, a volume, a weight, etc. of pavement material in a predetermined area.

In the present example, when the amount of pavement material inside the hopper 62 measured by the measuring unit 11 falls below the hopper reference level, the display device 5 displays that fact in a highlighted form. Specifically, when the height of pavement material falls below the hopper reference level in the entire area or part of the area inside the hopper 62, the display device 5 highlights the pertinent area in the image captured by the imaging device 2 (i.e., hopper image HG1). With this arrangement, the pavement material quantity displaying system 100 allows the operator to evaluate an excessive reduction of pavement material inside the hopper 62.

In the present example, further, when the amount of pavement material held in front of the screed 63 measured by the measuring unit 11 falls below the first screed reference level, the display device 5 displays that fact in a highlighted form. Specifically, when the amount of pavement material measured by the measuring unit 11 falls below the first screed reference level in a certain area within the road surface situated immediately in front of the screed 63, the display device 5 highlights such an area in the image captured by the imaging device 2 (i.e., the left surround image LG1 or the right surround image RG1). With this arrangement, the pavement material quantity displaying system 100 allows the operator to evaluate an excessive reduction in the amount of pavement material held on the road surface in front of the screed 63.

When the amount of pavement material held in front of the screed 63 measured by the measuring unit 11 exceeds the second screed reference level, the display device 5 displays that fact in a highlighted form. Specifically, when the amount of pavement material measured by the measuring unit 11 exceeds the second screed reference level in a certain area within the road surface situated immediately in front of the screed 63, the display device 5 highlights such an area in the image captured by the imaging device 2 (i.e., the left surround image LG1 or the right surround image RG1). With this arrangement, the pavement material quantity displaying system 100 allows the operator to evaluate an excessive increase of pavement material held on the road surface in front of the screed 63.

In the present example, when the height of pavement material measured by the measuring unit 11 falls below or exceeds a certain reference level, the pertinent area is displayed in a highlighted form. Alternatively, the amount of pavement material as such may be highlighted. For example, part of the same-elevation contour lines (specifically, the same-elevation contour lines corresponding to the amount of pavement material falling below the reference level) or the entire color or line type may be made different from standard lines. Further, the background color, pattern, character color, thickness, font type, or the like of the pop-up 303 indicating a feature quantity may be made different from standard ones. In the present example, the height of pavement material is compared with a certain reference. When another feature quantity of pavement material (e.g., average height, minimum height, maximum height, volume, weight, etc. in a predetermined area) falls below or exceeds a certain reference, the display device 5 may display that fact in a highlighted form. In this case, the display device 5 may show the background of the pop-up 303 indicating the feature quantity in a different color or pattern from a standard one, or show the characters in a different color, different thickness, or a different font type from a standard one.

FIG. 4 is a drawing illustrating another example of an output image displayed on the display device 5.

As illustrated in FIG. 4, the output image of the present example includes a hopper image HG2, a left surround image LG2, a right surround image RG2, a conveyor outlet image BG2, and an illustration image CG2.

Like the hopper image HG1, the hopper image HG2 is generated based on the captured image (input image) from the front camera 2F. In the present example, the hopper image HG2 is a bird's-eye image showing the inside of the hopper 62 when the hopper 62 is viewed from directly above. The hopper image HG1, which is generated by performing a known viewpoint conversion process on the input image from the front camera 2F, for example, is placed at the top center of the output image.

The left surround image LG2 is generated based on the captured image (input image) from the left camera 2L. In the present example, the left surround image LG2 is a bird's-eye image showing a left surround area as obtained when the surrounding area of the asphalt finisher 60 on the left is viewed from directly above, and includes an image of the left end of the screed 63 (i.e., the left rear screed 63L) and an image of the left end of the hopper 62. The left surround image LG2, which is generated by performing a known viewpoint conversion process on the input image form the left camera 2L, for example, is placed at the left end of the output image.

The right surround image RG2 is generated based on the captured image (input image) from the right camera 2R. In this example, the right surround image RG2 is a bird's-eye image showing a right surround area as obtained when the surrounding area of the asphalt finisher 60 on the right is viewed from directly above, and includes an image of the right end of the screed 63 (i.e., the right rear screed 63R) and an image of the right end of the hopper 62. The right surround image RG2, which is generated by performing a known viewpoint conversion process on the input image from the right camera 2R, for example, is placed at the right end of the output image.

The conveyor outlet image BG2 is an image of the rear end of the conveyor CV, namely the outlet of the conveyor CV. As in the case of the hopper image HG2, the left surround image LG2, and the right surround image RG2, the conveyor outlet image BG2 may be generated by performing a known viewpoint conversion process on an image captured by a camera (not shown) that captures an image near the outlet of the conveyor CV behind the tractor 61, or may be a computer graphics image like the illustration image CG2.

The conveyor outlet image BG2 is positioned such as to fit into an area corresponding to the conveyor outlet in the illustration image GC2.

An image similar to the conveyor outlet image BG2 may also be employed in the output image of FIG. 3 and FIG. 5. This arrangement allows the operator to evaluate the amount of pavement material near the conveyor outlet as will be described later.

The Illustration image CG2 is a computer graphic s image of the tractor 61 as viewed from directly above. In this example, the illustration image CG2 is placed at the bottom center of the output image.

In the manner as described above, the display device 5 operating under the control of the output image generating unit 10 displays an output image including the hopper image HG1, the left surround image LG2, the right surround image RG2, and the conveyor outlet image BG2 placed in such a manner as to allow the operator to recognize that the forward direction of the asphalt finisher 60 coincides with the upper end of the screen of the display device 5. Specifically, the display device 5 displays, for presentation to the operator, an output image having the illustration image CG2 at the center thereof and representing the asphalt finisher 60 and the surroundings thereof as viewed from directly above. This arrangement allows the operator to have an intuitive understanding of positional relationships between the asphalt finisher 60 and surrounding objects.

In the present example, as in the case of FIG. 3, the hopper image HG2, the left surround image LG2, and the right surround image RG2 of the output image have the superimposed indications of pavement material quantities as measured by the measuring unit 11 inside the hopper 62, in front of the left rear screed 63L, and in front of the right rear screed, respectively.

Like the hopper image HG1, the hopper image HG2 has a contour diagram 401 superimposed thereon that shows the distribution of pavement material inside the hopper 62. The contour diagram 401 illustrates the distribution of heights of pavement material relative to locations inside the hopper 62, for example. With this arrangement, the same effects and results as in the example of FIG. 3 are obtained.

In addition, like the hopper image HG1, the hopper image HG2 has a highlighted image 402 superimposed thereon. The highlighted image 402 indicates the area inside the hopper 62 where the amount (height) of pavement material inside the hopper 62 falls below the hopper reference level. With this arrangement, the same effects and results as in the example of FIG. 3 are obtained.

Further, the hopper image HG2 has a pop-up 403 superimposed thereon that shows a numerical value of a feature quantity relating to the amount of pavement material inside the hopper 62 and that is associated with a position inside the hopper 62 captured in the hopper image HG2. With this arrangement, the same effects and results as in the example of FIG. 3 are obtained.

Like the left surround image LG1 and the right surround image RG1, the left surround image LG2 and the right surround image RG2 have contour diagrams 404 and 405 superimposed thereon, respectively, that show the distribution of pavement material held in front of the left rear screed 63L and the right rear screed 63R, respectively. With this arrangement, the same effects and results as in the example illustrated in FIG. 3 are obtained.

Moreover, like the hopper image HG2, the left surround image LG2, and the right surround image RG2, the conveyor outlet image BG2 has information superimposed thereon that relates to the amount of pavement material supplied from the conveyor CV to a road surface area situated immediately in front of the front screed 63F. The method of displaying the amount of pavement material employed herein may be any method such as a contour diagram, a highlighted image, or a pop-up that shows the value of a feature quantity as in the case of the hopper image HG2, the left surround image LG2, and the right surround image RG2. With this arrangement, the pavement material quantity displaying system 100 allows the operator to properly evaluate a situation in which the amount of pavement material fed by the conveyor CV to a road surface area situated immediately in front of the front screed 63F is excessively reduced or increased. Upon evaluating the situation, the operator is able to perform operations such as opening and closing the hopper 62, thereby adjusting the amount of pavement material supplied by the conveyor CV to a road surface area situated immediately in front of the front screed 63F.

In the present example as described above, the display device 5 displays the amount of pavement material measured by the measuring unit 11 such that the displayed amount is associated with a position inside the hopper 62 or on a road surface area in front of the screed 63, the position being captured in the image from the imaging device 2 (specifically, a bird's-eye image of the asphalt finisher 60 and the surroundings thereof viewed from directly above). With this arrangement, the same effects and results as in the example illustrated in FIG. 3 are obtained.

FIG. 5 is a drawing illustrating yet another example of an output image displayed on the display device 5.

Similarly to the example illustrated in FIG. 3, the output image of the present example includes the hopper image HG1, the left surround image LG1, the right surround image RG1, and the illustration image CG1 as illustrated in FIG. 5, which are arranged in substantially the same positions as in the example illustrated in FIG. 3.

In the present example, further, the output image shows the amount of pavement material inside the hopper 62 measured by the measuring unit 11, as in the case of the example illustrated in FIG. 3.

As illustrated in FIG. 5, the illustration image CG1 in the output image of the present example has a line graph 501 superimposed thereon that indicates the distribution of pavement material in the lateral direction (in the Y-axis direction) at a predetermined position in the fore-and-aft direction (in the X-axis direction) inside the hopper 62. In other words, the line graph 501 represents the distribution of heights of pavement material inside the hopper 62 over a cross-section at the predetermined position in the fore-and-aft direction. The line graph 501 may alternatively indicate the distribution of heights of pavement material in the fore-and-aft direction at a predetermined position in the lateral direction inside the hopper 62. The line graph 501 may alternatively indicate the distribution of heights of pavement material in a horizontal-axis direction that is different from the X-axis direction and the Y-axis direction. Namely, the line graph 501 may indicate the distribution of heights of pavement material inside the hopper 62 over any chosen vertical cross-section. With this arrangement, the pavement material quantity displaying system 100 allows the operator to properly evaluate the amount of pavement material inside the hopper 62, specifically the distribution of heights of pavement material inside the hopper 62 along any chosen horizontal axis.

The position of the cross-section of pavement material represented by the line graph 501 may be determined in advance, or may be configurable as desired in accordance with predetermined operational inputs to the input device 3 given by the operator. In this case, a touchscreen panel mounted on the screen of the display device 5 may be used as the input device 3, and a touch gesture by the operator on the hopper image HG1 on the screen of the display device 5 may determine the position of a cross-section.

It may be noted that, in the present example, the line graph 501 (e.g., linear line graph or continuous-curved-line graph) is used to represent the distribution of pavement material quantities. Alternatively, a bar graph may be used. In the present example, the line graph 501 is displayed separately from the hopper image HG1. Alternatively, part or all of the line graph 501 may be superimposed on the hopper image HG1.

Moreover, the hopper image HG1 of the output image has pointing lines 502 superimposed thereon that indicate the position of a cross-section of the pavement material represented by the line graph 501. With this arrangement, the pavement material quantity displaying system 100 allows the operator to be aware of the position corresponding to the line graph 501 on the hopper image HG1.

The illustration image CG1 on the output image also has a pop-up 503 superimposed thereon that represents a feature quantity of pavement material (e.g., minimum height) over the direction of the distribution of the line graph 501 and that is associated with a position in the direction (i.e., lateral direction) of the distribution of the line graph 501. In the present example, the pop-up 503 is associated with such a position by a lead line extending from a particular position in the line graph 501. With this arrangement, the pavement material quantity displaying system 100 allows the operator to evaluate the amount of pavement material with a specific numerical value inside the hopper 62 in the direction of distribution represented by the line graph 501.

It may be noted that the illustration image CG1 of the present example may have, in place of or in addition to the line graph 501, another graph that represents the distribution of heights at a predetermined vertical cross-section of pavement material held in front of the left rear screed 63L and the right rear screed 63R. With this arrangement, the pavement material quantity displaying system 100 allows the operator to properly evaluate the amount of pavement material held in front of the screed 63, specifically the distribution of heights of pavement material held in front of the screed 63 extending along any chosen horizontal axis. In this case, the left surround image LG1 and the right surround image RG1 may display a pointing line that indicates the position of a cross-section of a pavement surface represented by the graph, similarly to the pointing lines 502.

In the present example as described above, the display device 5 graphically displays the amount of pavement material inside the hopper 62 and the amount of pavement material held in front of the screed 63 as measured by the measuring unit 11. To be more specific, the display device 5 displays a graph representing the distribution of heights of pavement material on any chosen vertical cross-section thereof. With this arrangement, the pavement material quantity displaying system 100 allows the operator to properly evaluate the distribution of heights of pavement material inside the hopper 62 along any chosen horizontal axis.

In the present example, the display device 5 displays a captured image (i.e., hopper image HG1, left surround image LG1, or right surround image RG1) from the imaging device 2 in which the position corresponding to the graph is indicated. To be more specific, the display device 5 displays a captured image from the imaging device 2 which has a pointing line superimposed thereon that indicates the position of a cross-section of the pavement material represented by the graph. With this arrangement, the pavement material quantity displaying system 100 allows the operator to evaluate the position corresponding to the graph inside the hopper 62 or on the road surface situated immediately in front of the screed 63.

Although the details of embodiments for implementing the present invention have heretofore been described, the present invention is not limited to such specific embodiments. Various modifications and variations may be made without departing from the scope of the invention defined in the claims.

For example, the embodiments described above have been directed to a configuration in which the distribution of pavement material quantities measured by the measuring unit 11 is displayed and superimposed on the real-time images captured by the imaging devices 2 (more specifically, images generated based on the real-time images captured by the imaging devices 2). This is however not a limiting configuration. Specifically, the configuration may be such that contour diagrams or the like indicating the distribution of pavement material quantities are superimposed on the hopper image HG1, the left surround image LG1, the right surround image RG1, the hopper image HG2, the left surround image LG2, and the right surround image RG2 that are still images generated based on images previously captured by the imaging devices 2. Alternatively, the configuration may be such that contour diagrams or the like indicating the distribution of pavement material quantities are displayed and superimposed on illustration images that are equivalent to the hopper image HG1, the left surround image LG1, and the right surround image RG1 or to the hopper image HG2, the left surround image LG2, and the right surround image RG2.

What is claimed is:

1. A road machine comprising:
   a hopper;
   a screed;
   imaging devices configured to capture an image of the hopper and left and right surround images in front of the screed;
   a measuring unit configured to measure an amount of pavement material inside the hopper or pavement material held in front of the screed, based on a position of a surface of the pavement material detected by a millimeter-wave radar, an ultrasonic radar, a light detection and ranging, or a stereo camera; and
   a display device disposed in an operator's seat and configured to display, superimposed on the image of the hopper, a contour diagram illustrating a distribution of the pavement material inside the hopper, and display, superimposed on the left and right surround images, contour diagrams illustrating distributions of the pavement material held in front of the screed, thereby displaying the amount of pavement material measured by the measuring unit,
   wherein the display device is further configured to, upon an occurrence of an event in which a height of the pavement material inside the hopper falls below a predetermined reference level, display a region in the image of the hopper in a color different from a rest of the image of the hopper, the region being where the height of the pavement material inside the hopper is below the predetermined reference level.

2. The road machine as claimed in claim 1, wherein the display device displays the amount of pavement material measured by the measuring unit in association with a position inside the hopper or on a road surface in front of the screed.

3. The road machine as claimed in claim 2, wherein the display device is configured to display a graph indicating the amount of pavement material measured by the measuring unit, and displays the image captured by the imaging device in which a position corresponding to the graph is indicated.

4. The road machine as claimed in claim 1, wherein the measuring unit measures a feature quantity relating to the amount of pavement material, and the display device displays the feature quantity measured by the measuring unit.

5. The road machine as claimed in claim 1, wherein upon an occurrence of an event in which the amount of pavement material measured by the measuring unit falls below a first reference level, the display device displays a highlighted indication indicative of the occurrence.

6. The road machine as claimed in claim 1, wherein upon an occurrence of an event in which the amount of pavement material held in front of the screed measured by the measuring unit exceeds a second reference level, the display device displays a highlighted indication of the occurrence.

7. The road machine as claimed in claim 1, further comprising an alarm unit configured to notify an operator of an event, upon an occurrence thereof, in which the amount of pavement material measured by the measuring unit deviates from a predetermined range.

* * * * *